United States Patent
Wangensteen et al.

(10) Patent No.: US 10,234,613 B2
(45) Date of Patent: Mar. 19, 2019

(54) HIGH CONTRAST INVERSE POLARIZER

(71) Applicant: Moxtek, Inc., Orem, UT (US)

(72) Inventors: Ted Wangensteen, Pleasant Grove, UT (US); Bin Wang, Lindon, UT (US); Matt George, Murray, UT (US); Paul Steven Mills, Orem, UT (US); Arash Farhang, Salt Lake City, UT (US)

(73) Assignee: Moxtek, Inc., Orem, UT (US)

( * ) Notice: Subject to any disclaimer, the term of this patent is extended or adjusted under 35 U.S.C. 154(b) by 43 days.

(21) Appl. No.: 15/631,164

(22) Filed: Jun. 23, 2017

(65) Prior Publication Data
US 2017/0285237 A1    Oct. 5, 2017

Related U.S. Application Data

(63) Continuation-in-part of application No. 15/006,566, filed on Jan. 26, 2016, now abandoned.

(60) Provisional application No. 62/113,101, filed on Feb. 6, 2015.

(51) Int. Cl.
*G02B 5/30* (2006.01)
*G02B 27/00* (2006.01)

(52) U.S. Cl.
CPC ......... *G02B 5/3058* (2013.01); *G02B 5/3075* (2013.01); *G02B 27/0012* (2013.01)

(58) Field of Classification Search
CPC ... G02B 5/3058; G02B 5/3075; G02B 27/283
USPC .................................................. 359/487.03
See application file for complete search history.

(56) References Cited

U.S. PATENT DOCUMENTS

| | | | |
|---|---|---|---|
| 6,212,014 B1 | 4/2001 | Lehman, Jr. et al. | |
| 6,288,840 B1 | 9/2001 | Perkins et al. | |
| 6,665,119 B1 | 12/2003 | Kurtz et al. | |
| 7,002,742 B2* | 2/2006 | Imaizumi | G02B 1/11 359/484.03 |
| 7,560,199 B2 | 7/2009 | Tan et al. | |
| 7,570,424 B2* | 8/2009 | Perkins | G02B 5/3058 359/485.05 |
| 7,697,108 B2 | 4/2010 | Nam et al. | |
| 8,363,319 B2 | 1/2013 | Sawaki | |

(Continued)

FOREIGN PATENT DOCUMENTS

JP    2011/070219 A    4/2011

*Primary Examiner* — Ricky D Shafer
(74) *Attorney, Agent, or Firm* — Thorpe, North & Western, LLP

(57) ABSTRACT

An embedded, inverse wire-grid polarizer (WGP) includes ribs 13 located over a surface of a transparent substrate 11, gaps 16 between the ribs 13, and a fill-layer 15 substantially filling the gaps 16. The fill-layer has a relatively high index of refraction, such as greater than 1.4. At a wavelength of light incident upon the WGP, $E_{\parallel}$ transmission can be greater than $E_{\perp}$ transmission. $E_{\parallel}$ is a polarization of light with an electric field oscillation parallel to a length L of the ribs, and $E_{\perp}$ is a polarization of light with an electric field oscillation perpendicular to a length L of the ribs. This embedded, inverse WGP is especially useful for polarizing, with high WGP performance, small wavelength (high-energy) regions of the electromagnetic spectrum (e.g. UV) which are difficult to polarize with conventional WGPs ($E_{\perp}$ transmission>$E_{\parallel}$ transmission).

20 Claims, 3 Drawing Sheets

(56) References Cited

U.S. PATENT DOCUMENTS

| | | |
|---|---|---|
| 8,416,371 B2 | 4/2013 | Kumai |
| 8,654,289 B2 | 2/2014 | Park |
| 8,797,643 B2 | 8/2014 | Shin |
| 8,913,321 B2 | 12/2014 | Davis |
| 9,348,076 B2 | 5/2016 | Wang et al. |
| 9,354,374 B2 | 5/2016 | Wang et al. |
| 9,632,223 B2 * | 4/2017 | Probst .................. G02B 1/08 |
| 2003/0076502 A1 | 4/2003 | Verma et al. |
| 2004/0120041 A1 | 6/2004 | Silverstein et al. |
| 2006/0001837 A1 | 1/2006 | Ho |
| 2007/0183035 A1 | 8/2007 | Asakawa et al. |
| 2007/0242352 A1 | 10/2007 | Macmaster |
| 2007/0296921 A1 * | 12/2007 | Wang .................. G02B 5/3058 353/20 |
| 2007/0297052 A1 | 12/2007 | Wang et al. |
| 2008/0278811 A1 | 11/2008 | Perkins et al. |
| 2008/0286455 A1 | 11/2008 | Hamamoto |
| 2009/0041971 A1 * | 2/2009 | Wang .................. G02B 5/1809 428/54 |
| 2010/0157420 A1 | 6/2010 | Shin |
| 2012/0257168 A1 | 10/2012 | Ishimatsu |
| 2013/0038933 A1 | 2/2013 | Wang et al. |
| 2013/0250411 A1 | 9/2013 | Bangerter et al. |
| 2013/0258471 A1 | 10/2013 | Davis |
| 2013/0342794 A1 | 12/2013 | Okada et al. |
| 2014/0300964 A1 | 10/2014 | Davis et al. |
| 2015/0062500 A1 | 3/2015 | Park et al. |
| 2015/0077851 A1 | 3/2015 | Wang et al. |
| 2015/0131150 A1 | 5/2015 | Probst et al. |
| 2015/0268176 A1 | 9/2015 | Deng et al. |
| 2015/0346497 A1 | 12/2015 | Huang et al. |
| 2016/0116754 A1 * | 4/2016 | Wang .................. G02B 27/283 359/489.06 |
| 2016/0170112 A1 * | 6/2016 | Suganuma ........... G02B 5/3058 359/485.03 |
| 2016/0231487 A1 * | 8/2016 | Wangensteen ...... G02B 27/0012 |

* cited by examiner

HIGH CONTRAST INVERSE POLARIZER

CLAIM OF PRIORITY

This application is a continuation-in-part of U.S. patent application Ser. No. 15/006,566, filed on Jan. 26, 2016, which claims priority to U.S. Provisional Patent Application No. 62/113,101, filed on Feb. 6, 2015, which are incorporated herein by reference in their entirety.

FIELD OF THE INVENTION

The present application is related generally to wire-grid polarizers.

BACKGROUND

Wire-grid polarizers (WGPs or WGP for singular) can be used to divide light into two different polarization states. One polarization state can mostly pass through the WGP and the other can be mostly absorbed or reflected. The effectiveness or performance of WGPs is based on a high percent transmission of one polarization and minimal transmission of an opposite polarization. A percent transmission of the primarily-transmitted polarization divided by a percent transmission of the opposite polarization is called contrast. It can be difficult to manufacture WGPs that provide sufficiently-high contrast. High contrast can sometimes be obtained by reducing the pitch of the wires/ribs, but doing so can be a difficult manufacturing challenge, especially for smaller wavelengths. It would be beneficial to find a way to improve WGP performance by some way other than a reduction in pitch.

SUMMARY

It has been recognized that it would be advantageous to improve wire-grid polarizer (WGP or WGPs for plural) performance by some way other than a reduction in pitch. The present invention is directed to various embodiments of embedded, inverse WGPs, methods of polarizing light, and methods of designing embedded, inverse WGPs, that satisfy these needs. Each embodiment may satisfy one, some, or all of these needs. For the following WGPs and methods, $E_\parallel$ is a polarization of light with an electric field oscillation parallel to a length L of the ribs and $E_\perp$ is a polarization of light with an electric field oscillation perpendicular to a length L of the ribs.

The embedded, inverse WGP can comprise ribs located over a surface of a transparent substrate, gaps between the ribs, and a fill-layer substantially filling the gaps. The ribs can be elongated and can be formed into an array. At a wavelength of light incident upon the WGP, $E_\parallel$ transmission can be greater than. $E_\perp$ transmission. In one embodiment, the wavelength of the light incident upon the WGP can be in a range≥175 nm. In another embodiment, the wavelength of the light incident upon the WGP can be in a range 175-400 nm. In another embodiment, the fill-layer can have an index of refraction greater than 1.7 at the wavelength of the light. In another embodiment, the fill-layer can comprise aluminum oxide, zirconium oxide, hafnium oxide, silicon nitride, tantalum oxide, tellurium oxide, germanium oxide, a transition metal oxides, a rare earth oxide, or combinations thereof.

BRIEF DESCRIPTION OF THE DRAWINGS
(DRAWINGS MIGHT NOT BE DRAWN TO SCALE)

DEFINITIONS

Figure 1A:
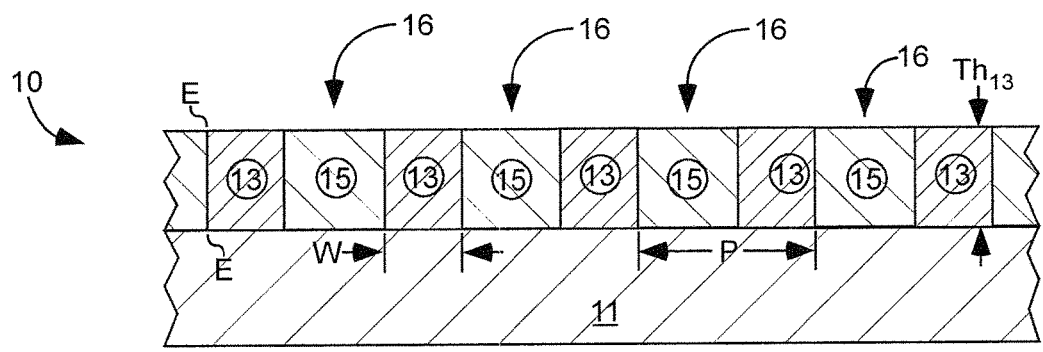
FIG. 1a is a schematic cross-sectional side view of an embedded, inverse wire-grid polarizer (WGP) 10 comprising ribs 13 located over a surface of a transparent substrate 11, gaps 16 between the ribs 13, and a fill-layer 15 substantially filling the gaps 16, in accordance with an embodiment of the present invention.
Figure 1B:
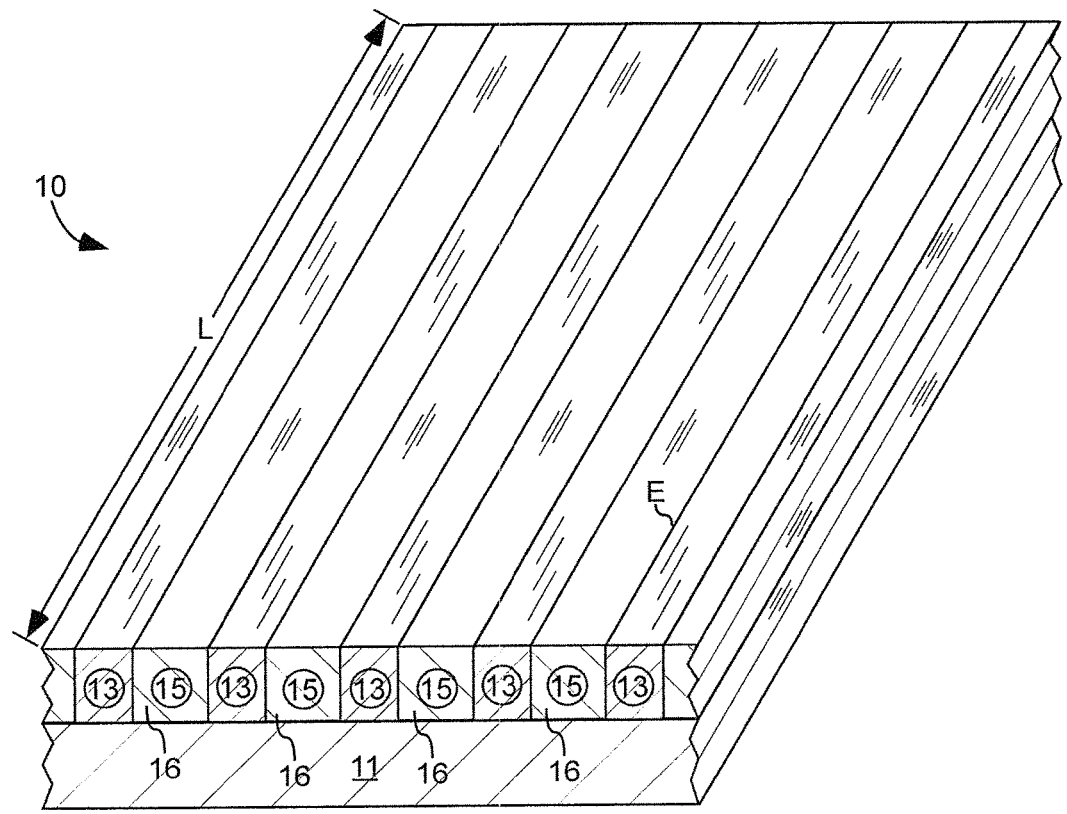
FIG. 1b is a schematic perspective-view of an embedded, inverse wire-grid polarizer (WGP) 10 comprising ribs 13 located over a surface of a transparent substrate 11, gaps 16 between the ribs 13, and a fill-layer 15 substantially filling the gaps 16, in accordance with an embodiment of the present invention.
Figure 2:
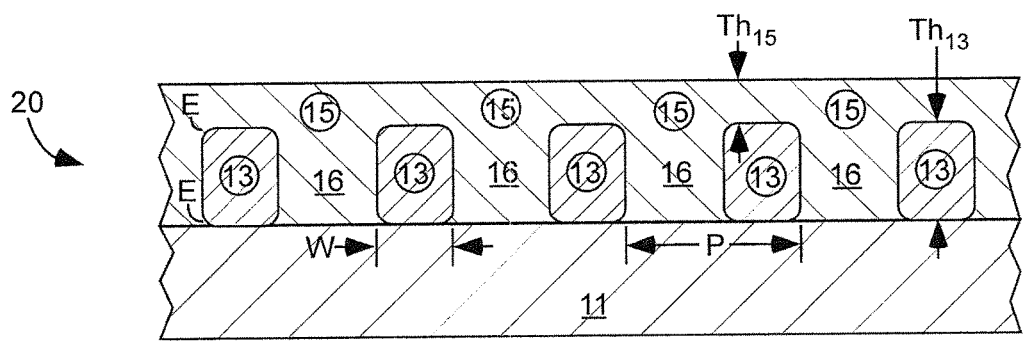
FIG. 2 is a schematic cross-sectional side view of WGP 20, similar to WGP 10, except that the fill-layer 15 of WGP 20 extends from the gaps 16 over the ribs 13, in accordance with an embodiment of the present invention.
Figure 3:
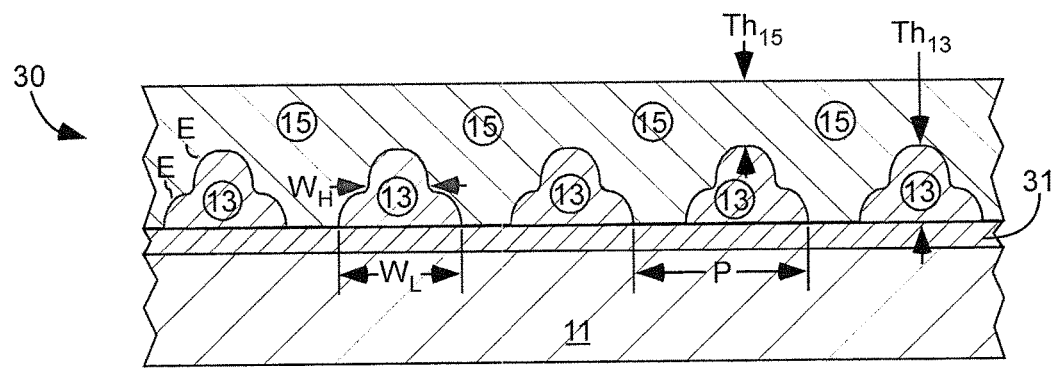
FIG. 3 is a schematic cross-sectional side view of WGP 30, similar to WGPs 10 & 20, except that the ribs 13 of WGP 30 include a substantial difference between a lower-rib-width $W_L$ and an upper-rib-width $W_H$, in accordance with an embodiment of the present invention.

As used herein, the term "elongated" means that a length L (see FIG. 1b) of the ribs 13 is substantially greater than rib width W or rib thickness $Th_{13}$ (see FIGS. 1a, 2, and 3). For example, WGPs for ultraviolet or visible light can have a rib width W between 20 and 100 nanometers and rib thickness between 50 and 500 nanometers; and rib length of about 1 millimeter to 20 centimeters or more, depending on the application. Thus, elongated ribs 13 can have a length L that is many times (e.g. at least 10 times in one aspect, at least 100 times in another aspect, at least 1000 times in another aspect, or at least 10,000 times in another aspect) larger than rib width W or rib thickness $Th_{13}$.

As used herein, the values of the "index of refraction" mean the values of the real part of the index, not the values of the imaginary part of the index, also known as the extinction coefficient.

As used herein, the term "light" can mean light or electromagnetic radiation in the x-ray, ultraviolet, visible, and/or infrared, or other regions of the electromagnetic spectrum.

As used herein, the term "nm" means nanometer(s).

As used herein, the term "thin-film layer" means a continuous layer that is not divided into a grid.

As used herein, the term "width" of the rib means the maximum width of the rib, unless specified otherwise.

Many materials used in optical structures absorb some light, reflect some light, and transmit some light. The following definitions are intended to distinguish between materials or structures that are primarily absorptive, primarily reflective, or primarily transparent. Each material can be primarily absorptive, primarily reflective, or primarily transparent in a specific wavelength of interest (e.g. all or a portion of the ultraviolet, visible, or infrared spectrums of light) and can have a different property in a different wavelength of interest.

1. As used herein, the term "absorptive" means substantially absorptive of light in the wavelength of interest.
   a. Whether a material is "absorptive" is relative to other materials used in the polarizer. Thus, an absorptive structure will absorb substantially more than a reflective or a transparent structure.
   b. Whether a material is "absorptive" is dependent on the wavelength of interest. A material can be absorptive in one wavelength range but not in another.
   c. In one aspect, an absorptive structure can absorb greater than 40% and reflect less than 60% of light in the wavelength of interest (assuming the absorptive structure is an optically thick film—i.e. greater than the skin depth thickness).
   d. In another aspect, an absorptive material can have a high extinction coefficient (k), relative to a transparent material, such as for example greater than 0.01 in one aspect or greater than 1.0 in another aspect.
   e. Absorptive ribs can be used for selectively absorbing one polarization of light.
2. As used herein, the term "reflective" means substantially reflective of light in the wavelength of interest.
   a. Whether a material is "reflective" is relative to other materials used in the polarizer. Thus, a reflective structure will reflect substantially more than an absorptive or a transparent structure.
   b. Whether a material is "reflective" is dependent on the wavelength of interest. A material can be reflective in one wavelength range but not in another. Some wavelength ranges can effectively utilize highly reflective materials. At other wavelength ranges, especially lower wavelengths where material degradation is more likely to occur, the choice of materials may be more limited and an optical designer may need to accept materials with a lower reflectance than desired.
   c. In one aspect, a reflective structure can reflect greater than 80% and absorb less than 20% of light in the wavelength of interest (assuming the reflective structure is an optically thick film—i.e. greater than the skin depth thickness).
   d. Metals are often used as reflective materials.
   e. Reflective wires can be used for separating one polarization of light from an opposite polarization of light.
3. As used herein, the term "transparent" means substantially transparent to light in the wavelength of interest.
   a. Whether a material is "transparent" is relative to other materials used in the polarizer. Thus, a transparent structure will transmit substantially more than an absorptive or a reflective structure.
   b. Whether a material is "transparent" is dependent on the wavelength of interest. A material can be transparent in one wavelength range but not in another.
   c. In one aspect, a transparent structure can transmit greater than 90% and absorb less than 10% of light at the wavelength of interest or wavelength range of use, ignoring Fresnel reflection losses.
   d. In another aspect, a transparent structure can have an extinction coefficient (k) of less than 0.01, less than 0.001, or less than 0.0001 in another aspect, at the wavelength of interest or wavelength range of use.
4. As used in these definitions, the term "material" refers to the overall material of a particular structure. Thus, a structure that is "absorptive" is made of a material that as a whole is substantially absorptive, even though the material may include some reflective or transparent components. Thus for example, a rib made of a sufficient amount of absorptive material so that it substantially absorbs light is an absorptive rib even though the rib may include some reflective or transparent material embedded therein.

DETAILED DESCRIPTION

As illustrated in FIGS. 1a, 1b, 2, and 3, embedded, inverse wire-grid polarizers (WGPs or WGP for singular) 10, 20, and 30 are shown comprising ribs 13 located over a surface of a transparent substrate 11. The ribs 13 can be elongated and can be formed into an array. The ribs 13 can be reflective, or can include a reflective portion. The ribs 13 can include an absorptive portion. The ribs 13 can be a metal or a dielectric or can include different regions, at least one of which is a metal and at least one of which is a dielectric.

For the following discussion, $E_\parallel$ is a polarization of light with an electric field oscillation parallel to a length L of the ribs and $E_\perp$ is a polarization of light with an electric field oscillation perpendicular to a length L of the ribs. In typical WGP use, $E_\perp$ is primarily transmitted and $E_\parallel$ is primarily reflected or absorbed. A WGP can be used as an inverse WGP in a wavelength range of light where $E_\parallel$ is primarily transmitted and $E_\perp$ is primarily reflected or absorbed ($E_\parallel$ transmission>$E_\perp$ transmission). Merely having $E_\parallel$ transmission>$E_\perp$ transmission is insufficient for many applications, and it can be important to optimize performance of the inverse WGP, meaning a high $E_\parallel$ transmission and/or high contrast ($E_\parallel$ transmission/$E_\perp$ transmission). The WGP structure can be optimized for improved inverse WGP performance.

The WGPs 10, 20, and 30 can have gaps 16 between the ribs 13. The term "gap" means a space, opening, or divide, separating one rib from another rib. A fill-layer 15, substantially filling the gaps 16, and especially a fill-layer 15 with a relatively large index of refraction, can improve inverse WGP performance. For example, an index of refraction of the fill-layer 15 can be greater than 1.4 in one aspect, greater than 1.5 in another aspect, greater than 1.6 in another aspect, greater than 1.7 in another aspect, greater than 1.75 in another aspect, greater than 1.8 in another aspect, greater than 1.9 in another aspect, greater than 2.0 in another aspect, or greater than 2.1 in another aspect. The aforementioned index of refraction values are those at the light wavelength of intended use (e.g. ≥100 nm, ≥150 nm, ≥175 nm, ≥200 nm, ≥250 nm, ≥300 nm, ≥400 nm, or ≥700 nm; and ≤200 nm, ≤250 nm, ≤300 nm, ≤400 nm, ≤700 nm, or ≤1000 nm), where $E_\parallel$ transmission>$E_\perp$ transmission. The fill-layer 15 can be a solid material or liquid. The fill-layer 15 can be transparent. Examples of fill-layer materials, for polarization of ultraviolet light, include aluminum oxide ($Al_2O_3$, n=1.81 at λ=300 nm), zirconium oxide ($ZrO_2$, n=2.25 at λ=361 nm), and hafnium oxide ($HfO_2$, n=2.18 at λ=365 nm). Other examples of fill-layer materials include silicon nitride, tantalum oxide, tellurium oxide, germanium oxide, transition metal oxides, oxides of elements with an atomic number≥20, and rare earth oxides (atomic numbers 21, 39, and 57-71).

Use of a fill-layer 15 to improve WGP performance, and especially use of a fill-layer with a relatively large index of refraction, is contrary to conventional WGP design theory. For example, see U.S. Pat. No. 6,288,840, column 6, line 59 through column 7, line 15. A conventional WGP ($E_\perp$ transmission>$E_\parallel$ transmission) may include a fill-layer for protection of the ribs, accepting a reduction in WGP performance. For example, see U.S. Pat. No. 6,288,840, column 1, lines 18-54.

The fill-layer 15 of WGPs 20 and 30 in FIGS. 2-3 substantially fills the gaps 16 and extends from the gaps 16 over the ribs 13 such that the fill-layer 15 in each gap 16 extends continuously over adjacent ribs 13 to the fill-layer 15 in each adjacent gap 16. Extending the fill-layer 15 over the ribs 13, and using certain thicknesses $Th_{15}$ of the fill-layer 15 over the ribs 13, can improve inverse WGP performance. The fill-layer 15 can extend over the ribs for a thickness $Th_{15}$ optimized for the desired wavelength range of use. For example, the fill-layer 15 can extend over the ribs for a thickness $Th_{15}$ of at least 25 nanometers in one aspect, at least 50 nanometers in another aspect, or at least 60 nanometers in another aspect, and less than 90 nanometers in one aspect, less than 100 nanometers in another aspect, or less than 150 nanometers in another aspect.

Use of a substrate 11 and/or a thin-film layer 31 (see FIG. 3) between the ribs 13 and the substrate 11, with a relatively large index of refraction, can improve inverse WGP performance and can shift the wavelength range at which $E_{\parallel}$ transmission>$E_{\perp}$ transmission. For example, an index of refraction of the substrate 11 and/or the thin-film layer 31 can be greater than 1.4 in one aspect, greater than 1.5 in another aspect, greater than 1.6 in another aspect, or greater than 1.8 in another aspect. The aforementioned index of refraction values are those at the light wavelength of intended use, where $E_{\parallel}$ transmission>$E_{\perp}$ transmission.

Rib 13 pitch P can be selected to improve inverse WGP performance and to shift the wavelength range at which $E_{\parallel}$ transmission>$E_{\perp}$ transmission. In conventional WGPs, the pitch needed for high-performance polarization can be less than one-half of the smallest wavelength in the desired polarization wavelength range. Consequently, a pitch of less than 150 nanometers is typically used for polarization of visible light ($\lambda/P \approx 150/400 = 2.67$), and around 100 nanometers or less for polarization of ultraviolet light. Manufacture of such polarizers can be difficult and costly due to this small pitch. Fortunately, optimal pitch P, for inverse WGPs described herein, can be larger than a pitch needed for conventional polarizers, thus improving the manufacturability of these inverse WGPs.

For example, the wavelength of the light of desired inverse polarization divided by a pitch P of the ribs 13 can be less than 2.5 in one aspect, less than 2.0 in another aspect, less than 1.9 in another aspect, less than 1.8 in another aspect, or less than 1.7 in another aspect. As another example, for inverse polarization of light with a wavelength of less than 400 nanometers (e.g. ultraviolet light), a pitch P of the ribs 13 can be greater than 140 nanometers. Pitch P of the ribs 13 and an index of refraction n of the fill-material 15 can be selected by the following equation: $P*(n-0.2) < \lambda < P*(n+0.2)$, where $\lambda$ is the wavelength of the light of desired inverse polarization.

Although pitch P for inverse polarization may be relatively large, for polarization of small wavelengths of light, such as less than 260 nanometer light in one aspect or less than 200 nanometer light in another aspect, small pitches P may be needed, such as for example less than 100 nanometers in one aspect, less than 80 nanometers in another aspect, or even less than 60 nanometers in another aspect.

A duty-cycle (W/P) of the ribs 13 can be selected to improve inverse WGP performance and to shift the wavelength range at which $E_{\parallel}$ transmission>$E_{\perp}$ transmission. For example, the following duty-cycles can improve contrast: greater than 0.45 in one aspect or greater than 0.55 in another aspect, and less than 0.60 in one aspect, less than 0.65 in another aspect, less than 0.70 in another aspect, or less than 0.80 in another aspect.

A lower duty-cycle can be selected to improve transmission of $E_{\parallel}$, and can broaden the wavelength range of high $E_{\parallel}$ transmission, but possibly by sacrificing contrast. Thus, a duty-cycle can be selected for improved transmission of $E_{\parallel}$, such as for example less than 0.7 in one aspect, less than 0.6 in another aspect, less than 0.5 in another aspect, or less than 0.4 in another aspect. For example, for a wavelength range of light of at least 30 nanometers, $E_{\parallel}$ transmission>$E_{\perp}$ transmission and $E_{\parallel}$ transmission can be greater than 80%. This wavelength range of light can be in a region of the electromagnetic spectrum of less than 400 nanometers, e.g. ultraviolet spectrum.

A smaller rib thickness $Th_{13}$ can improve contrast. For example, rib thickness $Th_{13}$ can be less than 70 nanometers in one aspect, less than 55 nanometers in another aspect, or less than 45 nanometers in another aspect.

Rib 13 shape can be selected to improve inverse WGP performance and to shift the wavelength range at which $E_{\parallel}$ transmission>$E_{\perp}$ transmission. Edges E (i.e. corners) of the ribs 13 can be approximately 90 degrees, thus forming rectangular-shaped ribs 13, as shown in FIGS. 1a and 1b. Alternatively, the edges E of the ribs 13 can be rounded, and thus a cross-sectional-profile of the ribs 13 can include a rounded shape, as shown in FIGS. 2-3. One, two, three, or more than three of the edges E or each rib 13 can be rounded. An end of the ribs 13 farther from the substrate (i.e. top of the ribs 13) can have a rounded-shape and/or an end of the ribs 13 closest to the substrate (i.e. bottom of the ribs 13) can be rounded. The ribs 13 can be formed with different shapes by adjusting the anisotropic/isotropic character of the etch, and other etch parameters, throughout the etch process.

Ribs 13 with multiple widths $W_L$ and $W_H$ in each rib 13, as shown on WGP 30 in FIG. 3, can broaden the wavelength range of high contrast. For example, a difference between a lower-rib-width $W_L$ and an upper-rib-width $W_H$ can be greater than 10 nanometers in one aspect, greater than 20 nanometers in another aspect, or greater than 30 nanometers in another aspect. Lower-rib-width $W_L$ means a maximum width of the ribs 13 in a lower-half of the rib 13 closer to the substrate 11. Upper-rib-width $W_H$ means a maximum width of the ribs 13 in an upper-half of the rib 13 farther from the substrate. The inventors found that, by selecting a difference between a lower-rib-width $W_L$ and an upper-rib-width $W_H$ of greater than 20 nanometers, for a wavelength range of light of at least 20 nanometers in the ultraviolet spectrum, the $E_{\parallel}$ transmission divided by the $E_{\perp}$ transmission can be at east 300. The ribs 13 can be formed with a different lower-rib-width $W_L$ and an upper-rib-width $W_H$ by adjusting the anisotropic/isotropic character of the etch, and other etch parameters, throughout the etch process.

WGPs described herein can be made with $E_{\parallel}$ transmission>$E_{\perp}$ transmission, with high contrast ($E_{\parallel}$ transmission/$E_{\perp}$ transmission), and with high $E_{\parallel}$ transmission, even in the difficult to polarize regions of the electromagnetic spectrum. For example, the WGPs described herein can have $E_{\parallel}$ transmission>$E_{\perp}$ transmission and contrast of at least 10 in one aspect, at least 100 in another aspect, at least 300 in another aspect, at least 400 in another aspect, at least 1000 in another aspect, at least 5000 in another aspect, or at least 10,000 in another aspect, at a certain wavelength or wavelength range. As another example, the WGPs described herein can have $E_{\parallel}$ transmission of at least 70&, at least 80%, or at least 90%, at a certain wavelength or wavelength range. These WGP performance numbers can even be achieved at a wavelength or a wavelength range of light in the electromagnetic spectrum of less than 400 nanometers in one aspect, less than 300 nanometers in another aspect, less than 270 nanometers in another aspect, or a wavelength in or across the ultraviolet spectrum in another aspect.

A method of polarizing light can comprise one or more of the following:
1. providing an inverse, embedded WGP as described herein; and
2. transmitting more $E_\parallel$ through the WGP than $E_\perp$ with contrast ($E_\parallel$ transmission/$E_\perp$ transmission) as described above and at a wavelength or wavelength range as described herein.

A method of designing an embedded, inverse WGP can comprise one or more of the following for matching or tuning the inverse WGP performance ($E_\parallel$ transmission>$E_\perp$ transmission) to a desired wavelength or wavelength range and/or for improving WGP performance (contrast and/or % $E_\parallel$ transmission) at that wavelength or wavelength range:
1. calculating a pitch of an array of ribs 13;
2. calculating an index of refraction of a fill-layer 15, located over the array of ribs 13 and substantially filling gaps 16 between the ribs 13;
3. selecting rib 13 material;
4. selecting rib thickness $Th_{13}$;
5. selecting duty cycle (W/P);
6. selecting rib 13 shape;
7. selecting thickness $Th_{15}$ of the fill-layer 15 over the array of ribs 13; and
8. selecting substrate material.

Integrated circuits (ICs or IC) can be made of semiconductor material and can include nanometer-sized features. ICs can be used in various electronic devices (e.g. computer, motion sensor, etc.). Defects in the IC can cause the electronic device to fail. Thus, inspection of the IC can be important for avoiding failure of the electronic device, while in use by the consumer. Such inspection can be difficult due to the small feature-size of IC components. Light, with small wavelengths (e.g. ultraviolet), can be used to inspect small feature-size components. It can be difficult to have sufficient contrast between these small feature-size components and defects or their surroundings. Use of polarized light can improve integrated circuit (IC) inspection contrast. It can be difficult to polarize the small wavelengths of light (e.g. ultraviolet/UV) used for IC inspection. Polarizers that can polarize such small wavelengths, and that can withstand exposure to high-energy wavelengths of light, may be needed.

Figure 4:
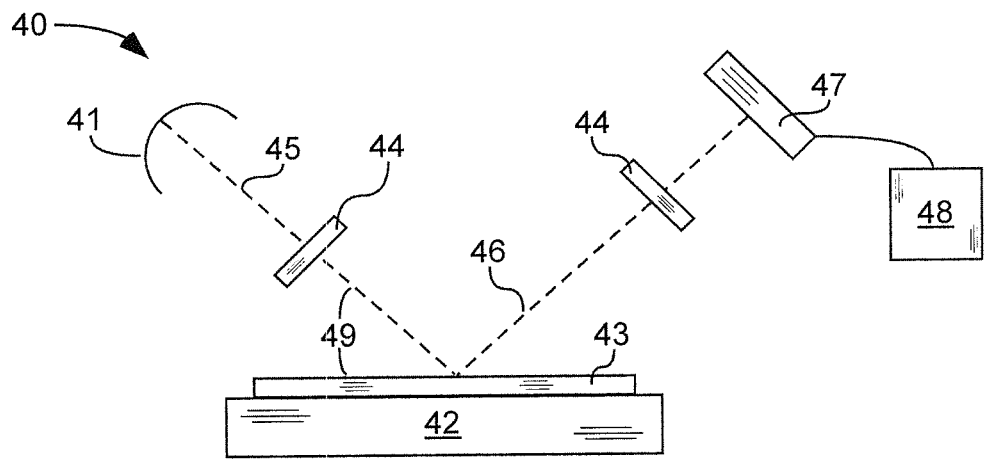
FIG. 4 is a schematic perspective view of an integrated circuit (IC) inspection tool 40, using at least one WGP 44 to polarize light 45, in accordance with an embodiment of the present invention.

The WGPs described herein can polarize small wavelengths of light (e.g. UV) and can be made of materials sufficiently durable to withstand exposure to such light. The fill-material 15 can protect the ribs 13 from UV light damage. An IC inspection tool 40 is shown in FIG. 4, comprising a light source 41 and a stage 42 for holding an IC wafer 43. The light source 41 can be located to emit an incident light-beam 45 (e.g. visible, ultraviolet, or x-ray) onto the IC wafer 43. The incident light-beam 45 can be directed to the wafer 43 by optics (e.g. mirrors). The incident light-beam 45 can have an acute angle of incidence 49 with a face of the wafer 43. To improve inspection contrast, a WGP 44 (according to an embodiment described herein) can be located in, and can polarize, the incident light-beam 45.

A detector 47 (e.g. CCD) can be located to receive an output light-beam 46 from the IC wafer 43. An electronic circuit 48 can be configured to receive and analyze a signal from the detector 47 (the signal based on the output light-beam 46 received by the detector 47). To improve inspection contrast, a WGP 44 (according to an embodiment described herein) can be located in, and can polarize, the output light-beam 45.

Figure 5:
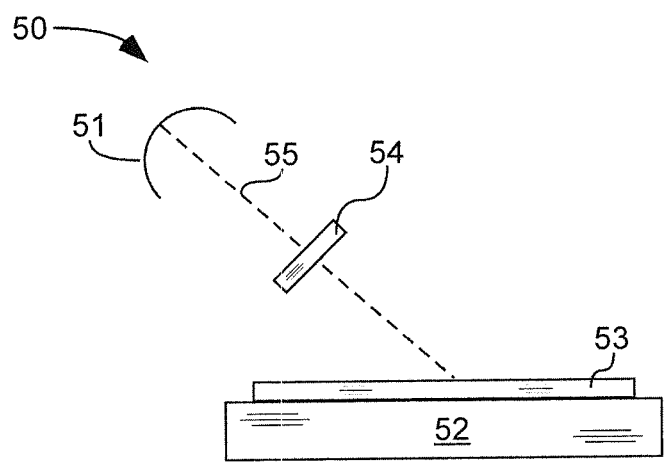
FIG. 5 is a schematic perspective view of a flat panel display (FPD) manufacturing tool 50, using at least one WGP 54 to polarize light 55, in accordance with an embodiment of the present invention.

The WGPs described herein can be used in the manufacture of flat panel displays (FPDs for plural or FPD for singular). FPDs can include an aligned polymer film and liquid crystal. An FPD manufacturing tool 50 is shown in FIG. 5, comprising a light source 51, a stage 52 for holding an FPD 53, and a WGP 54 (according to an embodiment described herein). The light source 51 can emit ultraviolet light 55. The WGP 54 can be located between the light source 51 and the stage 52 and can polarize the ultraviolet light 55. Exposing the FPD 53 to polarized ultraviolet light 55 can align the polymer film. See U.S. Pat. Nos. 8,797,643 and 8,654,289, both incorporated herein by reference. Exposing the FPD 53 to polarized ultraviolet light 55 can help repair the FPD 53. See U.S. Pat. No. 7,697,108, which is incorporated herein by reference.

What is claimed is:

1. An embedded, inverse wire-grid polarizer (WGP) comprising:
   ribs located over a surface of a transparent substrate, gaps between the ribs, and a fill-layer substantially filling the gaps, the ribs being elongated and formed into an array;
   at a wavelength of light incident upon the WGP in a range≥175 nm, $E_\parallel$ transmission>$E_\perp$ transmission, where $E_\parallel$ is a polarization of the light with an electric field oscillation parallel to a length of the ribs and $E_\perp$ is a polarization of the light with an electric field oscillation perpendicular to a length of the ribs;
   the fill-layer having an index of refraction greater than 1.7 at the wavelength of the light; and
   the fill-layer substantially fills the gaps and extends from the gaps over the ribs such that the fill-layer in each gap extends continuously over adjacent ribs to the fill-layer in each adjacent gap, the fill-layer extending over the ribs for a thickness of between 25 and 150 nanometers.

2. A method of using the WGP of claim 1, comprising transmitting more $E_\parallel$ through the WGP than $E_\perp$ at the wavelength of light.

3. The WGP of claim 1, wherein, at the wavelength of the light, the $E_\parallel$ transmission divided by the $E_\perp$ transmission is at least 1000.

4. The WGP of claim 1, wherein the wavelength of light incident upon the WGP is in a range of 200-300 nm.

5. The WGP of claim 1, wherein the index of refraction is greater than 1.8 at the wavelength of the light.

6. The WGP of claim 1, wherein the index of refraction is greater than 2.0 at the wavelength of the light.

7. The WGP of claim 1, wherein the fill layer comprises aluminum oxide.

8. The WGP of claim 1, wherein a difference between a lower-rib-width and an upper-rib-width is greater than 20 nanometers, where lower-rib-width means a maximum width of the ribs in a lower-half of the rib closer to the substrate and upper-rib-width means a maximum width of the ribs in an upper-half of the rib farther from the substrate.

9. The WGP of claim 1, wherein the fill-layer comprises aluminum oxide, zirconium oxide, hafnium oxide, silicon nitride, tantalum oxide, tellurium oxide, germanium oxide, a transition metal oxides, a rare earth oxide, or combinations thereof.

10. An embedded, inverse wire-grid polarizer (WGP) comprising:
    ribs located over a surface of a transparent substrate, gaps between the ribs, and fill-layer substantially filling the gaps, the ribs being elongated and formed into an array;

at a wavelength of light incident upon the WGP in a range≥175 nm, $E_\parallel$ transmission>$E_\perp$ transmission, where $E_\parallel$ is a polarization of the light with an electric field oscillation parallel to a length of the ribs and $E_\perp$ is a polarization of the light with an electric field oscillation perpendicular to a length of the ribs;

the fill-layer having an index of refraction greater than 1.7 at the wavelength of the light; and the fill-layer extends over the ribs for a thickness of between 60 and 90 nanometers.

11. The WGP of claim 10, wherein the fill-layer comprises aluminum oxide, zirconium oxide, hafnium oxide, or combinations thereof.

12. The WGP of claim 10, wherein the $E_\parallel$ transmission divided by the $E_\perp$ transmission is at least 300.

13. The WGP of claim 10, wherein the fill layer comprises aluminum oxide.

14. The WGP of claim 10, wherein a difference between a lower-rib-width and an upper-rib-width is greater than 20 nanometers, where lower-rib-width means a maximum width of the ribs in a lower-half of the rib closer to the substrate and upper-rib-width means a maximum width of the ribs in an upper-half of the rib farther from the substrate.

15. An embedded, inverse wire-grid polarizer (WGP) comprising:

ribs located over a surface of a transparent substrate, gaps between the ribs, and a fill-layer substantially filling the gaps, the ribs being elongated and formed into an array; at a wavelength of light incident upon the WGP in a range≥175 nm, $E_\parallel$ transmission>$E_\perp$ transmission, where $E_\parallel$ is a polarization of the light with an electric field oscillation parallel to a length of the ribs and $E_\perp$ is a polarization of the light with an electric field oscillation perpendicular to a length of the ribs;

the fill-layer having an index of refraction greater than 1.7 at the wavelength of the light; and a difference between a lower-rib-width and an upper-rib-width is greater than 10 nanometers, where lower-rib-width means a maximum width of the ribs in a lower-half of the rib closer to the substrate and upper-rib-width means a maximum width of the ribs in an upper-half of the rib farther from the substrate.

16. The WGP of claim 15, wherein the difference between the lower-rib-width and the upper-rib-width is greater than 20 nanometers.

17. The WGP of claim 15, wherein the fill layer comprises aluminum oxide.

18. The WGP of claim 15, wherein the fill-layer comprises aluminum oxide, zirconium oxide, hafnium oxide, or combinations thereof.

19. The WGP of claim 15, wherein the index of refraction is greater than 1.8 at the wavelength of the light.

20. The WGP of claim 15, wherein, at the wavelength of the light, the $E_\parallel$ transmission divided by the $E_\perp$ transmission is at least 1000.

* * * * *